United States Patent [19]

Marino

[11] Patent Number: 5,742,440
[45] Date of Patent: Apr. 21, 1998

[54] ACTUATOR WITH REDUCED LENS TILT ERROR

[75] Inventor: Philip Frank Marino, Rochester, N.Y.

[73] Assignee: Eastman Kodak Company, Rochester, N.Y.

[21] Appl. No.: 686,161

[22] Filed: Jul. 24, 1996

Related U.S. Application Data

[60] Provisional application No. 60/007,035, Oct. 25, 1995.

[51] Int. Cl.$^6$ ............................................. G02B 7/02
[52] U.S. Cl. ...................... 359/814; 359/823; 369/44.15
[58] Field of Search ............................ 359/811, 813, 359/814, 823; 369/44.15, 44.16, 44.14

[56] References Cited

U.S. PATENT DOCUMENTS

| | | | |
|---|---|---|---|
| 4,811,320 | 3/1989 | Kawasaki et al. | 359/813 |
| 5,007,712 | 4/1991 | Kikuchi et al. | 359/813 |
| 5,128,806 | 7/1992 | Ohno | 359/813 |
| 5,381,273 | 1/1995 | Goda | 359/823 |

*Primary Examiner*—Loha Ben
*Attorney, Agent, or Firm*—Raymond L. Owens

[57] ABSTRACT

An optical actuator is disclosed for positioning a lens to focus a laser light on a surface of a member, such as on optical disk, with minimum lens tilt error. The optical actuator includes a lens mount for supporting the lens, and at least two spaced-apart flexures that are fixed to the lens mount. The flexures are arranged so that they are parallel when viewed from one side. The optical actuator further includes a structure for applying a force to the lens mount along a line and between the flexures so that when viewed from the parallel flexure side the line bisects each flexure to cause the flexures to deflect such that as the lens moves to focus the light beam, lens tilt error is minimized.

6 Claims, 2 Drawing Sheets

ACTUATOR WITH REDUCED LENS TILT ERROR

CROSS-REFERENCE TO RELATED APPLICATIONS

Reference is made to and priority claimed from U.S. Provisional application Ser. No. 60/007,035, filed Oct. 25, 1995, entitled ACTUATOR WITH REDUCED LENS TILT ERROR.

Reference is made to commonly assigned U.S. application Ser. No. 08/686,162, entitled "Lens Tilt Error Reduction Actuator" by Phil Marino, filed Jul. 24, 1996.

FIELD OF THE INVENTION

This invention relates to optical actuators, and more particularly to focusing a laser beam on a surface, such as an optical disk, so that lens tilt error is minimized.

BACKGROUND OF THE INVENTION

An optical disk recording and reading device includes a lens which focuses a laser light beam onto an optical disk while the disk is rotating. Focus and/or tracking actuators are used in optical disk recording and reading devices to control the position of the lens relative to the rotating disk. The actuators are necessary because of unavoidable warp of the disks, spindle errors, and other mechanical and optical imperfections.

Both focus and tracking of optical disks must continuously be maintained while the disks are recording and/or reading. Focus is controlled by adjusting the distance between the lens and the disk surface. Tracking is controlled by maintaining the lens at the correct radial position such that a single data track is read or written at a time. The motions of the actuator are controlled by a servo system.

Alignment of the optical axis of the lens to the disk (i.e., lens tilt) must be maintained accurately for the system to function properly. Errors in lens alignment are caused by various manufacturing and assembly errors, such as lens installation in the actuator, installation and alignment of the actuator in the writer, and actuator motion errors. The motion errors are caused by tilting of the actuator as it is moved to maintain focus and tracking relative to the rotating disk. The lens tilt caused by actuator motion is typically minimized by careful actuator design and tight tolerances on actuator parts and assembly processes, which are difficult, time consuming, labor intensive and expensive.

The problem with the presently known and utilized optical actuator is the existence of an inherent lens tilt error during focus motion. The inherent lens tilt error, which is independent of manufacturing and assembly errors, causes the overall system to operate improperly. Consequently, available laser power is not used effectively, and the spot size, shape and quality of the laser light beam cannot be controlled properly. Manufacturing and assembly costs are also increased.

SUMMARY OF THE INVENTION

It is an object of this invention to provide optical actuators with minimized lens tilt error.

It is another object of this invention to provide improved system performance by obtaining better controlled spot size, shape, and quality of the laser light beam.

Yet another object of this invention is to provide more effective use of available laser power.

A further object of this invention is to decrease manufacturing and assembly costs by assigning a larger portion of the allowable lens tilt to manufacturing and assembly errors.

These objects are achieved by an optical actuator for positioning a lens to focus a laser light beam on a surface of a member, such as an optical disk, with minimum lens tilt error, comprising:

a) a lens mount for supporting the lens;

b) at least two spaced-apart flexures, each fixed to the lens mount, the flexures being arranged so that they are parallel when viewed from one side; and c) means for applying a force to the lens mount along a line and between the flexures so that when viewed from the parallel flexure side the line bisects each flexure to cause the flexures to deflect such that as the lens moves to focus the light beam, lens fit error is minimized.

ADVANTAGES

An optical actuator according to this invention provides an optical actuator with minimized lens tilt error by substantially reducing the change in flexure length during focus motion.

An optical actuator according to this invention provides improved system performance by providing more effective use of the available laser power, and better controlled spot size, shape and quality of the laser light beam.

An optical actuator according to this invention provides for a larger portion of the allowable lens tilt to be assigned to manufacturing and assembly errors. This results in lower cost and/or less critical and less costly manufacturing and assembly processes.

DETAILED DESCRIPTION OF THE INVENTION

Figure 1:
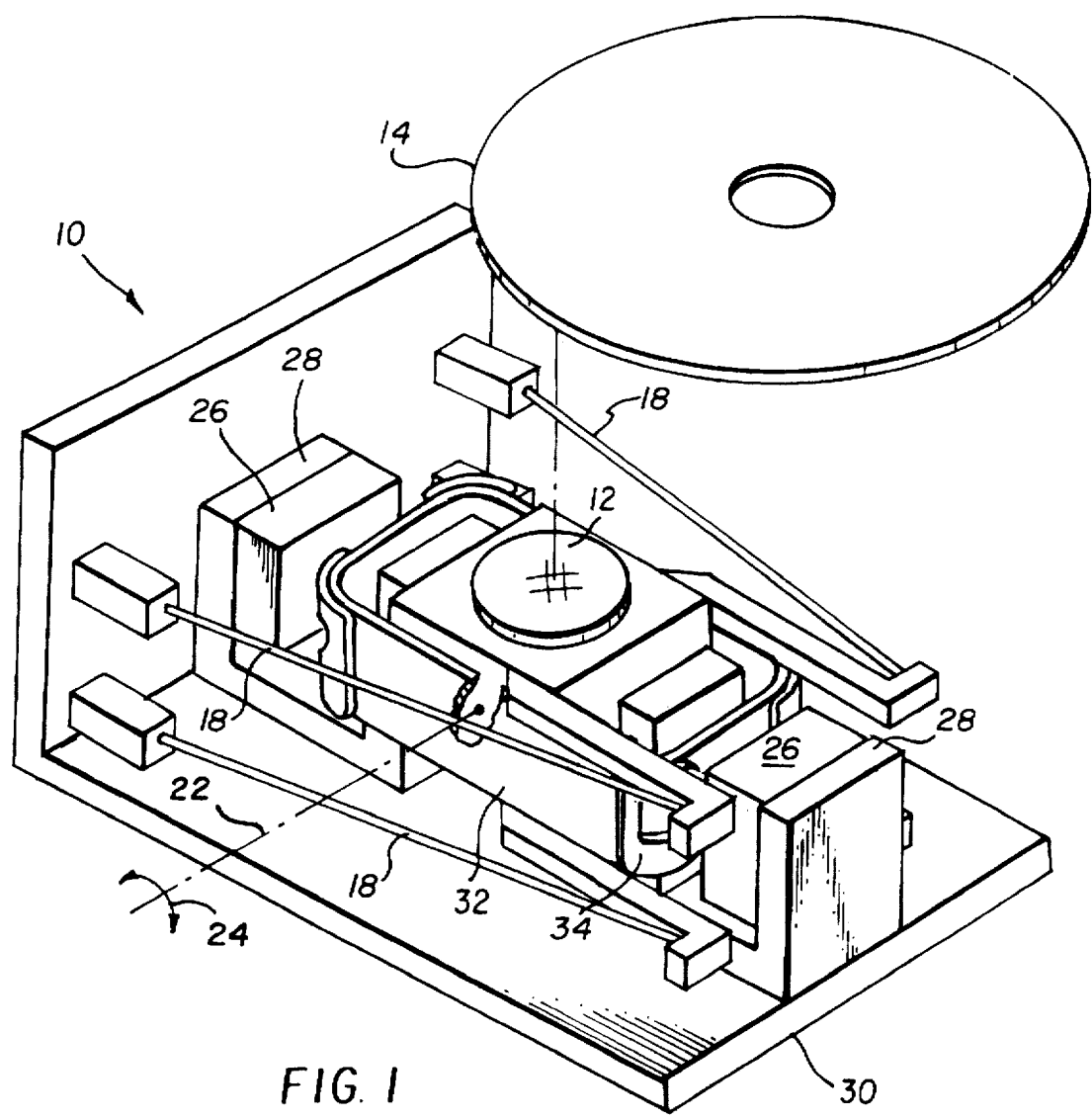
FIG. 1 is a perspective view of the optical actuator showing a structure for applying a force to the actuator in accordance with the present invention to minimize lens tilt error.

Referring to FIG. 1, a perspective view of an optical actuator 10 in accordance with this invention is shown. The optical actuator 10 includes a lens 12 which is well known in the art to focus a laser light beam on a surface of a disk member 14. Preferably, the disk member 14 is an optical reading and/or recording disk. The lens 12 is fixed to a lens mount 16 by an adhesive or other fastening structure not shown. The optical actuator 10 further includes at least two spaced-apart flexures 18, which are arranged so that they are parallel when viewed from one side. Preferably, the flexures 18 include four wires. The flexures can be made of molded plastic. Each flexure 18 is fixed to the lens mount 16. Preferably, the lens mount 16 is made of a molded plastic, such as VECTRA (General Electric Company).

Figure 2:
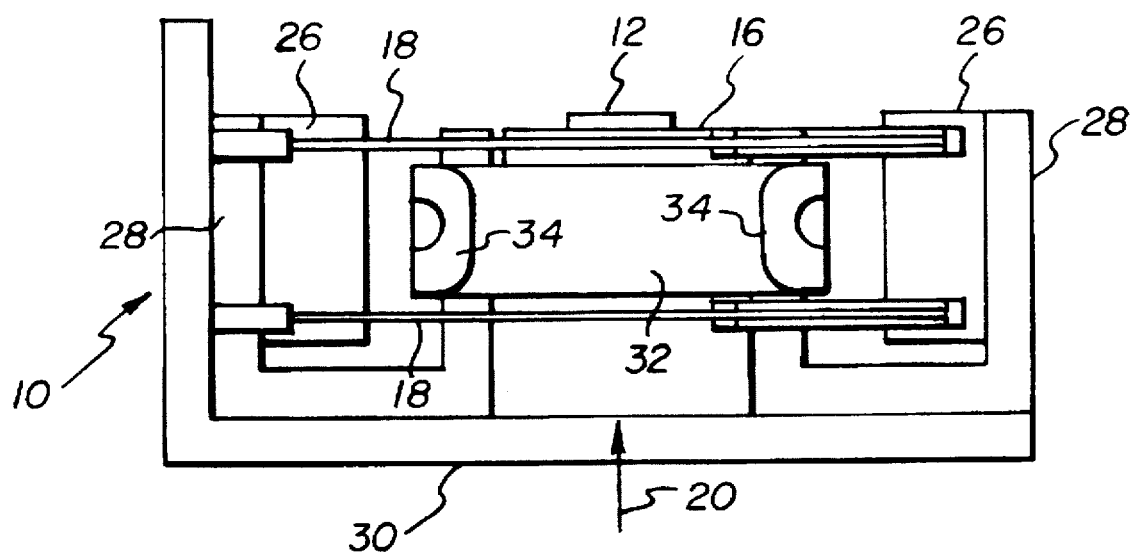
FIG. 2 is a side view of the optical actuator of FIG. 1, showing flexures fixed to a lens mount in accordance with the present invention.

Referring to FIG. 2, a side view of the optical actuator in accordance with this invention is shown. To focus the laser light beam on the surface of the optical disk 14, a force is applied to the lens mount 16 along a line 20 perpendicular to the surface of the optical disk 14 and between the flexures 18, so that when viewed from the side the focus force line 20 bisects each flexure 18. The force causes each flexure 18 to deflect so that the lens mount 16 supporting the lens 12 moves in a direction along the focus force line 20, which is perpendicular to the surface of the optical disk 14, in order to focus the laser light beam on the surface of the optical disk 14.

Movement of the lens mount 16 causes tension and compression of each flexure 18. The tension and compression of the flexures 18 result in lens tilt, i.e., rotation of the lens 12 about a line 22 through the lens 12 and parallel to the surface of the optical disk 14. The direction of the lens tilt is known as the lens pitch 24. This is shown in FIG. 1.

When the focus force is applied to the lens mount 16 in the optimum location with respect to the flexures 18, the nominal lens tilt caused by tension and compression of the flexures 18 will be zero. The lens pitch 24 will be proportional to the difference between the optimum location of the focus force and the actual location of the focus force. Preferably, a nominal lens tilt of zero is obtained by applying the focus force to the lens mount 16 along the focus force line 20 and between the flexures 18 so that when viewed from the parallel flexure side, the focus force line 20 bisects each flexure 18. With the focus force being applied at this location, the tension and compression of the flexures 18 is substantially minimized so that the length of each flexure 18 remains substantially the same.

Referring again to FIG. 2, a conventional motor arrangement is shown which can be used to apply focus force to the lens mount 16. The motor arrangement includes a pair of magnets 26, which are fixed to a pair of magnetic yokes 28. The magnetic yokes 28 are secured to opposite sides of a base 30. The motor arrangement further includes a focus motor coil 32 and four tracking motor coils 34. The focus motor coil 32 is wrapped around the magnetic yokes 28 and the lens mount 16. Each tracking motor coil 34 is secured to a corner of the focus motor coil 32.

In operation, current is applied to the focus motor coil 32 to create a magnetic field. By energizing the focus motor coil 32, the lens mount 16 moves in a direction along the focus force line 20, which is perpendicular to the surface of the optical disk 14. By energizing the tracking motor coils 34, the lens mount 16 moves in a direction parallel to the plane of the optical disk 14 for tracking of the optical disk 14 during recording or reading.

The invention has been described in detail with particular reference to a preferred embodiment thereof. However, it will be understood that variations and modifications can be effected within the spirit and scope of the invention.

Parts List 10 optical actuator
12 lens
14 optical disk
16 lens mount
18 flexures
20 focus force line
22 line
24 lens pitch
26 magnet
28 magnetic yoke
30 base
32 focus motor coil
34 tracking motor coil

What is claimed is:

1. An optical actuator for positioning a lens to focus a laser light beam on a surface of a member, such as an optical disk, with minimum lens tilt error, comprising:

a) a base;

b) a lens mount for supporting the lens;

c) at least two spaced-apart flexures, each fixed at one end to the lens mount and at the other end to the base, the flexures being arranged so that they are parallel when viewed from one side; and d) means for applying a force to the lens mount along a line and between the flexures so that when viewed from the parallel flexure side the line bisects each flexure to cause the flexures to deflect such that as the lens moves to focus the light beam, lens tilt error is minimized.

2. The optical actuator according to claim 1 wherein the focus force line when viewed from the parallel flexure side is positioned through the center of the lens.

3. The optical actuator according to claim 1 wherein the flexures are wires.

4. The optical actuator according to claim 3 wherein the flexures further include four wires.

5. The optical actuator according to claim 1 wherein the flexures are molded plastic.

6. The optical actuator according to claim 5 wherein the flexures further include four plastic molded flexures.

* * * * *